UNITED STATES PATENT OFFICE.

LEWIS B. TEBBETTS, 2d, OF ST. LOUIS, MISSOURI.

PROCESS FOR MAKING POWDERED OR GRANULATED ALUMINUM.

1,327,743. Specification of Letters Patent. Patented Jan. 13, 1920.

No Drawing. Application filed December 4, 1917. Serial No. 205,359.

*To all whom it may concern:*

Be it known that I, LEWIS B. TEBBETTS, 2d, a citizen of the United States, residing in the city of St. Louis and State of Missouri, have invented a new and useful Improvement in Processes for Making Powdered or Granulated Aluminum, of which the following is a specification.

This invention relates to a new and useful process of making powdered or granulated aluminum.

An object of the invention is to provide a process whereby a mass of aluminum may be converted into a powdered or granulated form.

Another object of the invention is to convert a mass of aluminum into granules of predetermined sizes.

Having in view the above objects to be attained by the process, as well as other advantages, I have evolved the process hereinafter disclosed.

When a mass of aluminum is at a temperature slightly below its melting point, the mass becomes extremely brittle so that it may be crumbled or powdered with facility. The present process consists in bringing a mass of aluminum to this predetermined temperature and violently agitating the same while at this temperature. It is preferable to raise the temperature of a mass of aluminum to a point above six hundred and fifty-five degrees centigrade, the melting point, and while the aluminum is in the molten state to initiate the agitation thereof by stirring or by other means, and permitting the metal to cool while the agitation continues. When the temperature reaches a point just below the melting point the mass will be broken into granules, the degree of granulation being controlled by the violence of the agitation.

If the aluminum be in the form of granules and it is desired to further pulverize the metal in this condition the result may be effected by slowly raising the temperature to the predetermined point and agitating the mass by stirring or by any other method.

The essential feature of the process is the agitation or vibration of the metal when at the predetermined temperature,—that is just before the melting point of the metal is attained.

What I claim and desire to secure by Letters Patent is:—

1. The process of pulverizing metallic aluminum, which consists in agitating the mass at a temperature immediately below the melting point thereof.

2. The process of pulverizing metallic aluminum, which consists in raising the temperature thereof above the melting point, agitating the mass, and continuing the agitation thereof until the metal is solidified.

3. The process of pulverizing metallic aluminum, which consists in heating the metal to a temperature above the melting point of the aluminum, agitating the aluminum while in a heated condition, and reducing the temperature until the metal is solidified.

4. The process of pulverizing metallic aluminum, which consists in heating the metal above the melting point of the aluminum, agitating the aluminum while in a heated condition, and reducing the temperature until the metal is solidified while the mass is being agitated.

LEWIS B. TEBBETTS, 2D.